(12) United States Patent
Pullagurla et al.

(10) Patent No.: US 12,709,291 B2
(45) Date of Patent: Aug. 18, 2026

(54) SYSTEMS AND METHODS FOR USING MULTIPLE VEHICLES TO INCREASE CONFIDENCE LEVEL

(71) Applicant: TORC Robotics, Inc., Blacksburg, VA (US)

(72) Inventors: Harish Pullagurla, Blacksburg, VA (US); Ryan Chilton, Blacksburg, VA (US); Jason William Harper, Blacksburg, VA (US); Jordan Grant Stone, Blacksburg, VA (US)

(73) Assignee: TORC ROBOTICS, INC., Blacksburg, VA (US)

( * ) Notice: Subject to any disclaimer, the term of this patent is extended or adjusted under 35 U.S.C. 154(b) by 269 days.

(21) Appl. No.: 18/343,109

(22) Filed: Jun. 28, 2023

(65) Prior Publication Data

US 2024/0217544 A1 Jul. 4, 2024

Related U.S. Application Data

(60) Provisional application No. 63/477,403, filed on Dec. 28, 2022.

(51) Int. Cl.
*B60W 60/00* (2020.01)

(52) U.S. Cl.
CPC ....... *B60W 60/001* (2020.02); *B60W 2552/00* (2020.02); *B60W 2554/4046* (2020.02); *B60W 2556/40* (2020.02); *B60W 2556/45* (2020.02); *B60W 2720/10* (2013.01)

(58) Field of Classification Search
CPC ........... B60W 60/001; B60W 2552/00; B60W 2554/4046; B60W 2556/40; B60W 2556/45; B60W 2720/10
See application file for complete search history.

(56) References Cited

U.S. PATENT DOCUMENTS

| | | | |
|---|---|---|---|
| 12,235,112 B1 | 2/2025 | Arnicar et al. | |
| 2018/0024562 A1* | 1/2018 | Bellaiche | B60R 1/025 701/26 |
| 2019/0155827 A1 | 5/2019 | Giurgiu et al. | |
| 2020/0174493 A1* | 6/2020 | Lin | G05D 1/0088 |
| 2020/0247420 A1 | 8/2020 | Gunaratne | |
| 2021/0331703 A1 | 10/2021 | Duan et al. | |
| 2023/0100014 A1* | 3/2023 | Duan | B60W 60/0025 701/25 |

* cited by examiner

*Primary Examiner* — Ramya P Burgess
*Assistant Examiner* — Chanmin Park
(74) *Attorney, Agent, or Firm* — Armstrong Teasdale LLP

(57) ABSTRACT

A method of controlling an autonomous vehicle, including: collecting perception data representing a perceived environment of the vehicle using a perception system on board the autonomous vehicle; comparing the perception data collected with digital map data; and modifying operation of the vehicle based on an amount of difference between the perception data and the digital map data.

19 Claims, 5 Drawing Sheets

SYSTEMS AND METHODS FOR USING MULTIPLE VEHICLES TO INCREASE CONFIDENCE LEVEL

CROSS-REFERENCE TO RELATED APPLICATIONS

This application claims priority to U.S. Provisional Patent Application Ser. No. 63/477,403, filed Dec. 28, 2022, which is incorporated by reference in its entirety.

TECHNICAL FIELD

The present disclosure relates generally to autonomous vehicles and, more specifically, to systems and methods for autonomous vehicle operation.

BACKGROUND

One type of architecture for autonomous vehicle systems includes determination of a location of a vehicle on a detailed digital map of the vehicle route, and controlling various aspects of the vehicle based on the details of the digital map. However, the detailed digital map may be inaccurate or partially out-of-date when the vehicle is traveling the route. For example, the features on the digital map may have changed due to road construction or road maintenance. How to properly address such inconsistencies in the digital map for the autonomous operation can be problematic.

The systems and methods of the present disclosure may solve one or more of the problems set forth above and/or other problems in the art. The scope of the current disclosure, however, is defined by the attached claims, and not by the ability to solve any specific problem.

SUMMARY

Autonomous vehicle systems may require little or no human interaction to operate the vehicle and navigate it from an origin location to a destination location. Embodiments herein may also find use with simpler, semi-autonomous systems, such as ADAS (advanced driver assistance systems), as will be understood by those of skill in this art.

In one embodiment, a method of controlling an autonomous vehicle, includes: collecting perception data representing a perceived environment of the vehicle using a perception system on board the autonomous vehicle; comparing the perception data collected with digital map data; and modifying operation of the vehicle based on an amount of difference between the perception data and the digital map data.

In another embodiment, a system for controlling an autonomous vehicle, includes: a perception system; a processing device; and a memory storing digital map data and one or more processor-readable instructions, that when executed by the processing device, cause the system to: collect perception data representing a perceived environment of the vehicle using the perception system on board the autonomous vehicle; compare the perception data collected with the digital map data; and modify operation of the autonomous vehicle based on an amount of difference between the perception data and the digital map data.

In yet another embodiment, a method of controlling an autonomous vehicle, includes: collecting perception data representing a perceived environment of a first vehicle using a perception system on board the first vehicle; comparing the perception data collected with digital map data stored on the first vehicle; providing comparison data associated with the comparison between the perception data collected and the digital map data stored on the first vehicle to a server remote from the vehicle; and modifying operation of the autonomous vehicle based on the comparison data provided to the server.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting and it may be readily understood that certain aspects of the disclosed systems and methods can be variously arranged and combined, all of which arrangements and combinations are contemplated by this disclosure.

Figure 1:
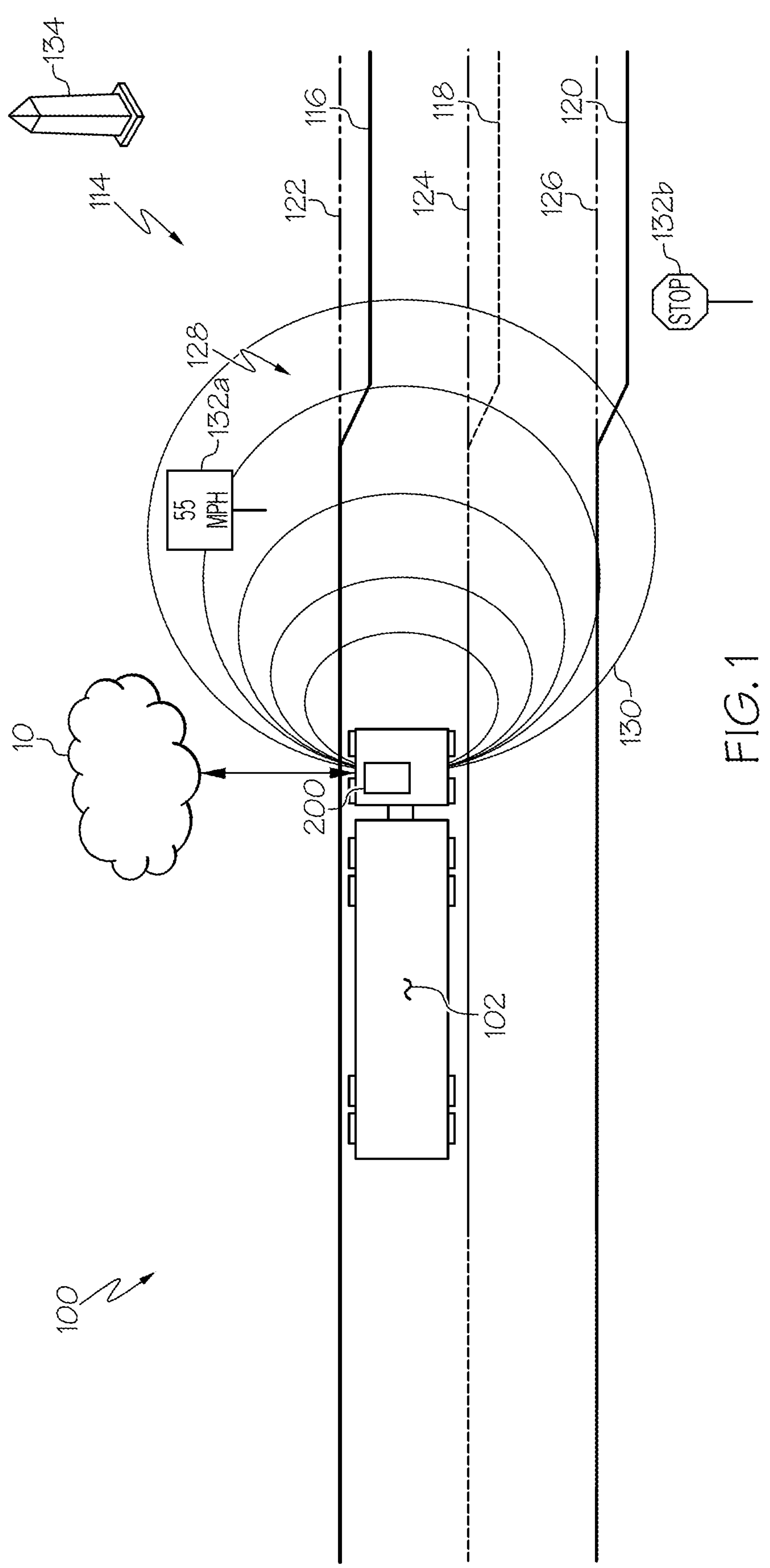
FIG. 1 is a birdseye view of a roadway including a schematic representation of a vehicle and aspects of an autonomy system of the vehicle, according to an embodiment.
Figure 4:
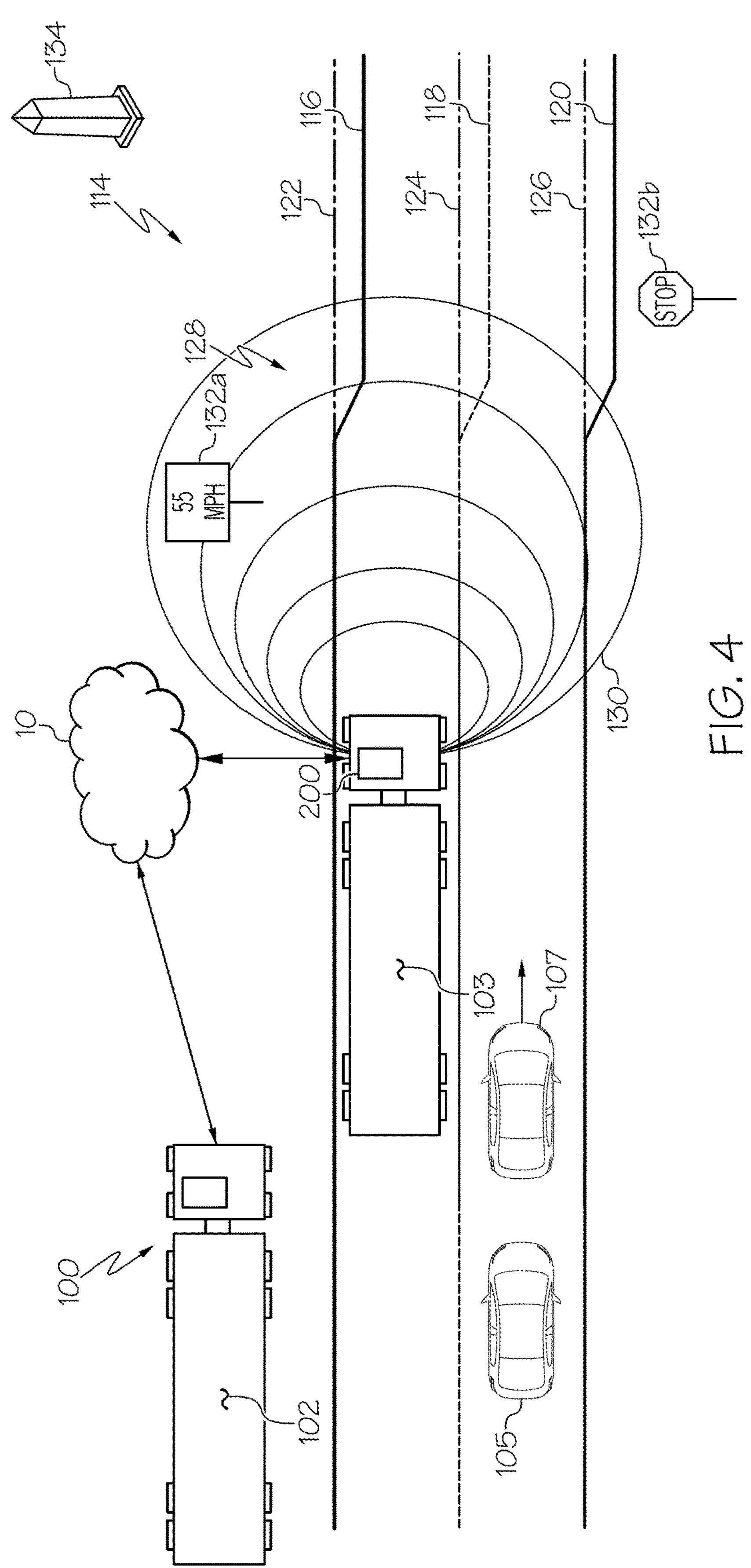
FIG. 4 is a birdseye view of a roadway including a schematic representation of a vehicle, a second vehicle, and aspects of the autonomy system of FIG. 1, according to an embodiment.

Referring to FIGS. 1 and 4, the present disclosure relates to autonomous (may also be referred to as automated) vehicles, such as an autonomous truck 102 having an autonomy system 200. The autonomy system 200 of truck 102 may be completely autonomous (i.e., fully-autonomous), such as self-driving, driverless, or Level 4 autonomy, or semi-autonomous, such as Level 3 autonomy. As used herein the term "autonomous" includes both fully-autonomous and semi-autonomous. The autonomy system 200 may be structured on three aspects of technology: 1) perception, 2) maps/localization, and 3) behaviors planning and control. The function of the perception aspect is to sense an environment surrounding truck 102 and interpret it. To interpret the surrounding environment, a perception module or engine in the autonomy system 200 of the truck 102 may identify and classify objects or groups of objects in the environment. For example, a perception module associated with various sensors (e.g., LiDAR, camera, radar, etc.) of the autonomy system 200 may identify one or more objects (e.g., pedestrians, vehicles, debris, etc.) and features of the roadway (e.g., lane lines) around truck 102, and classify the objects in the road distinctly.

The maps/localization aspect of the autonomy system 200 may be configured to determine where on a pre-established digital map the truck 102 is currently located. One way to do this is to sense the environment surrounding the truck 102 (e.g., via the perception system) and to correlate features of the sensed environment with details (e.g., digital representations of the features of the sensed environment) on the digital map.

Once the systems on the truck 102 have determined its location with respect to the digital map features (e.g., location on the roadway, upcoming intersections, road signs, etc.) the truck 102 can plan and execute maneuvers and/or routes with respect to the features of the digital map. The behaviors, planning, and control aspects of the autonomy system 200 may be configured to make decisions about how the truck 102 should move through the environment to get to its goal or destination. It may consume information from the perception and maps/localization modules to know where it is relative to the surrounding environment and what other objects and traffic actors are doing.

FIG. 1 further illustrates an exemplary environment for modifying one or more actions of truck 102 using the autonomy system 200. The truck 102 is capable of communicatively coupling to a network and associated remote server 10, but does not necessarily connect with the network 10 while it is in operation (e.g., driving down the roadway). That is, the network 10 may be a server remote from the vehicle and the truck 102 may deploy with all the necessary perception, localization, and vehicle control software and data necessary to complete its mission fully-autonomously or semi-autonomously. While this disclosure refers to a truck (i.e., a tractor trailer) 102 as the autonomous vehicle, it is understood that the truck 102 could be any type of vehicle including an automobile, a mobile industrial machine, etc. While the disclosure will discuss a self-driving or driverless autonomous system, it is understood that the autonomous system could alternatively be semi-autonomous having varying degrees of autonomy or autonomous functionality.

Figure 2:
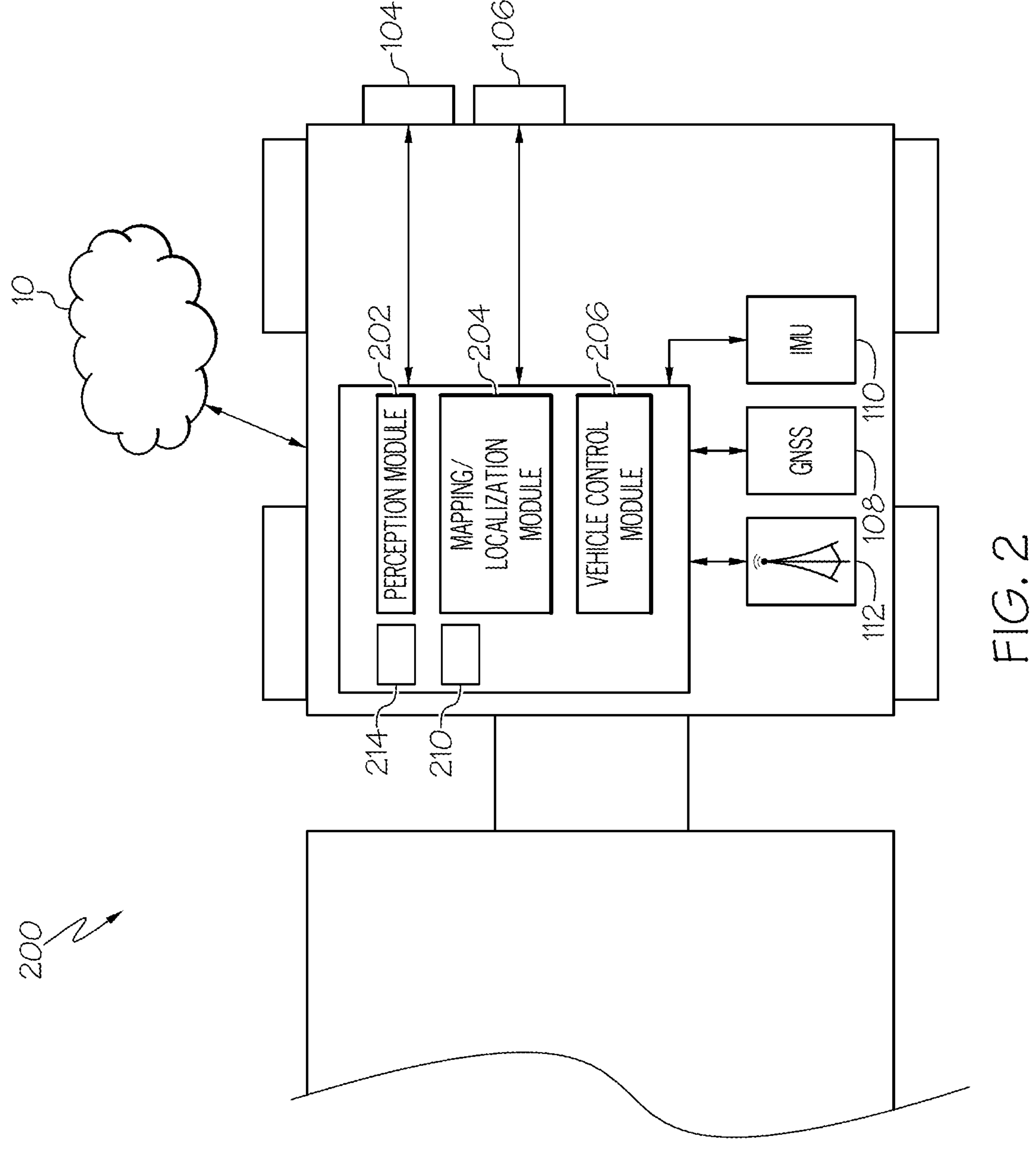
FIG. 2 is a schematic of the autonomy system of the vehicle of FIG. 1, according to an embodiment.

With reference to FIGS. 1, 2, and 4, autonomy system 200 may include a perception system including a camera system 104, a LiDAR system 106, a GNSS receiver 108, an inertial measurement unit (IMU) 110, and/or a perception module 202. The autonomy system 200 may further include a transceiver 112, a processor 210, a memory 214, a mapping/localization module 204, and a vehicle control module 206. The various systems may serve as inputs to and receive outputs from various other components of the autonomy system 200. In other examples, the autonomy system 200 may include more, fewer, or different components or systems, and each of the components or system(s) may include more, fewer, or different components. Additionally, the systems and components shown may be combined or divided in various ways. As show in FIG. 1, the perception systems aboard the autonomous vehicle may help the truck 102 perceive its environment out to a perception radius 130. The actions of the truck 102 may depend on the extent of perception radius 130.

The camera system 104 of the perception system may include one or more cameras mounted at any location on the truck 102, which may be configured to capture images of the environment surrounding the truck 102 in any aspect or field of view (FOV). The FOV can have any angle or aspect such that images of the areas ahead of, to the side, and behind the truck 102 may be captured. In some embodiments, the FOV may be limited to particular areas around the truck 102 (e.g., forward of the truck 102) or may surround 360 degrees of the truck 102. In some embodiments, the image data generated by the camera system(s) 104 may be sent to the perception module 202 and stored, for example, memory 214.

The LiDAR system 106 may include a laser generator and a detector and can send and receive a LiDAR signals. The LiDAR signal can be emitted to and received from any direction such that LiDAR point clouds (or "LiDAR images") of the areas ahead of, to the side, and behind the truck 102 can be captured and stored as LiDAR point clouds. In some embodiments, the truck 102 may include multiple LiDAR systems and point cloud data from the multiple systems may be stitched together. In some embodiments, the system inputs from the camera system 104 and the LiDAR system 106 may be fused (e.g., in the perception module 202). The LiDAR system 106 may include one or more actuators to modify a position and/or orientation of the LiDAR system 106 or components thereof. The LIDAR system 106 may be configured to use ultraviolet (UV), visible, or infrared light to image objects and can be used with a wide range of targets. In some embodiments, the LiDAR system 106 can be used to map physical features of an object with high resolution (e.g., using a narrow laser beam). In some examples, the LiDAR system 106 may generate a point cloud and the point cloud may be rendered to visualize the environment surrounding the truck 102 (or object(s) therein). In some embodiments, the point cloud may be rendered as one or more polygon(s) or mesh model (s) through, for example, surface reconstruction. Collectively, the LiDAR system 106 and the camera system 104 may be referred to herein as "imaging systems."

The GNSS receiver 108 may be positioned on the truck 102 and may be configured to determine a location of the truck 102 via GNSS data, as described herein. The GNSS receiver 108 may be configured to receive one or more signals from a global navigation satellite system (GNSS) (e.g., GPS system) to localize the truck 102 via geolocation. The GNSS receiver 108 may provide an input to and otherwise communicate with mapping/localization module 204 to, for example, provide location data for use with one or more digital maps, such as an HD map (e.g., in a vector layer, in a raster layer or other semantic map, etc.). In some embodiments, the GNSS receiver 108 may be configured to receive updates from an external network.

The IMU 110 may be an electronic device that measures and reports one or more features regarding the motion of the truck 102. For example, the IMU 110 may measure a velocity, acceleration, angular rate, and or an orientation of the truck 102 or one or more of its individual components using a combination of accelerometers, gyroscopes, and/or magnetometers. The IMU 110 may detect linear acceleration using one or more accelerometers and rotational rate using one or more gyroscopes. In some embodiments, the IMU 110 may be communicatively coupled to the GNSS receiver 108 and/or the mapping/localization module 204, to help determine a real-time location of the truck 102, and predict a location of the truck 102 even when the GNSS receiver 108 cannot receive satellite signals.

The transceiver 112 may be configured to communicate with one or more external networks 10 via, for example, a wired or wireless connection in order to send and receive information. The wireless connection may be a wireless communication signal (e.g., Wi-Fi, cellular, LTE, 5*g*, etc.) In some embodiments, the transceiver 112 may be configured to communicate with external network(s) via a wired connection, such as, for example, during initial installation, testing, or service of the autonomy system 200 of the truck 102. A wired/wireless connection may be used to download and install various lines of code in the form of digital files (e.g., HD digital maps), executable programs (e.g., navigation programs), and other computer-readable code that may be used by the system 100 to navigate the truck 102 or otherwise operate the truck 102, either fully-autonomously or semi-autonomously. The digital files, executable programs, and other computer readable code may be stored locally or remotely and may be routinely updated (e.g., automatically or manually) via the transceiver 112 or updated on demand. In some embodiments, the truck 102 may not be in constant communication with the network 10 and updates which would otherwise be sent from the network 10 to the truck 102 may be stored at the network 10 until such time as the network connection is restored. In some embodiments, the truck 102 may deploy with all of the data and software it needs to complete a mission (e.g., necessary perception, localization, and mission planning data) and may not utilize any connection to network 10 during some or the entire mission. For example, in some embodiments, the truck 102 may only connect to the network 10 when its confidence level is degraded, for example, below a threshold confidence level as described in greater detail herein, such that it only receives and sends updates to the network 10 based on a degraded ability or an inability to continue its mission. The truck 102 may send updates to the network 10 (e.g., regarding unknown or newly detected features in the environment as detected by perception systems) using the transceiver 112. For example, when the truck 102 detects differences in the perceived environment with the features on a digital map, the truck 102 may update the network 10 with information, as described in greater detail herein.

The processor 210 of autonomy system 200 may be embodied as one or more of a data processor, a microcontroller, a microprocessor, a digital signal processor, a logic circuit, a programmable logic array, or one or more other devices for controlling the autonomy system 200 in response to one or more of the system inputs. Autonomy system 200 may include a single microprocessor or multiple microprocessors that may include means for identifying and reacting to differences between features in the perceived environment and features of the maps stored on the truck 102. Numerous commercially available microprocessors can be configured to perform the functions of the autonomy system 200. It should be appreciated that autonomy system 200 could include a general machine controller capable of controlling numerous other machine functions. Alternatively, a special-purpose machine controller could be provided. Further, the autonomy system 200, or portions thereof, may be located remote from the system 100. For example, one or more features of the mapping/localization module 204 could be located remote of truck 102. Various other known circuits may be associated with the autonomy system 200, including signal-conditioning circuitry, communication circuitry, actuation circuitry, and other appropriate circuitry.

Figure 3A:
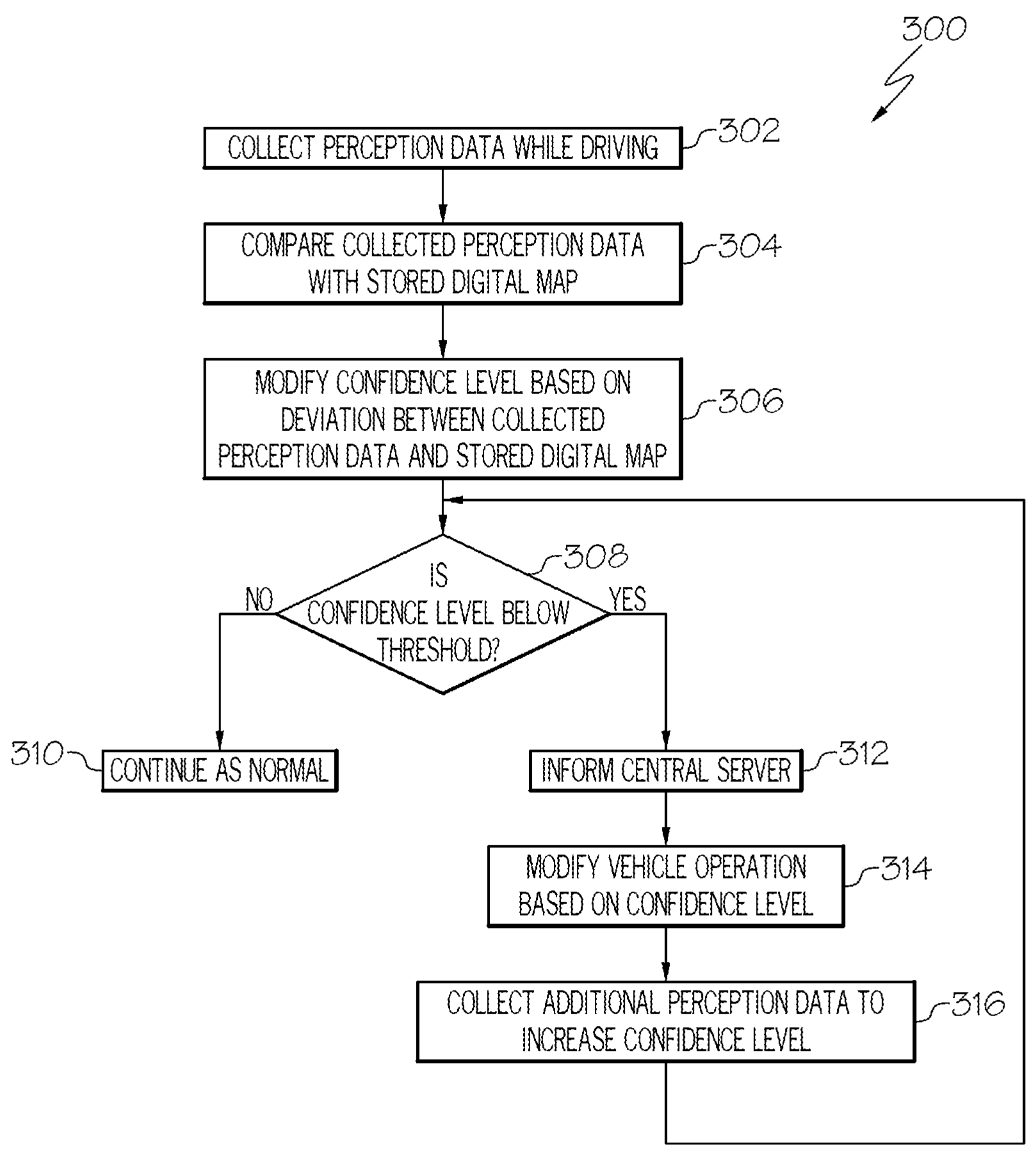
FIG. 3A is an exemplary process for using the autonomy system of the vehicle of FIG. 1, according to an embodiment.
Figure 3B:
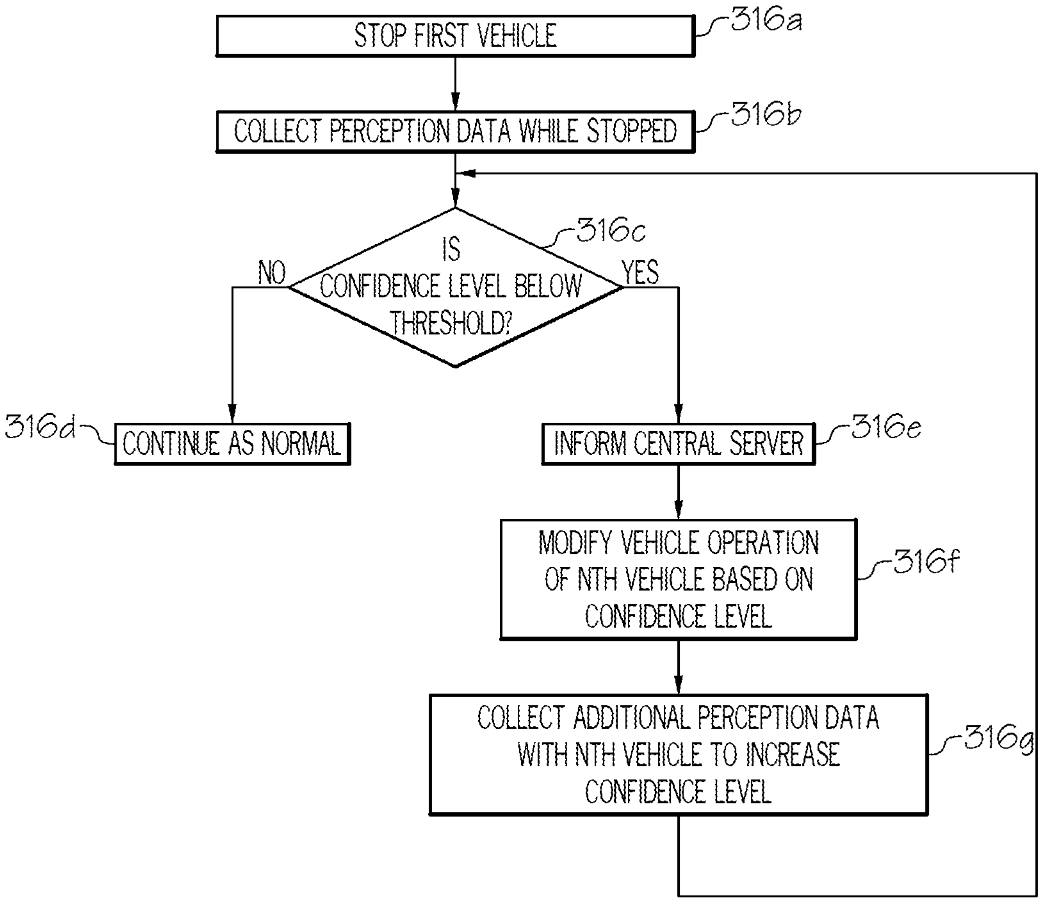
FIG. 3B is an exemplary process for collecting additional perception data, according to an embodiment.

The memory 214 of autonomy system 200 may store data and/or software routines that may assist the autonomy system 200 in performing its functions, such as the functions of the perception module 202, the mapping/localization module 204, the vehicle control module 206, and the exemplary method 300 described herein with respect to FIGS. 3A and 3B. Further, the memory 214 may also store data received from various inputs associated with the autonomy system 200, such as perception data from the perception system.

As noted above, perception module 202 may receive input from the various sensors, such as camera system 104, LiDAR system 106, GNSS receiver 108, and/or IMU 110 (collectively "perception data") to sense an environment surrounding the truck 102 and interpret it. To interpret the surrounding environment, the perception module 202 (or "perception engine") may identify and classify objects or groups of objects in the environment. For example, the truck 102 may use the perception module 202 to identify one or more objects (e.g., pedestrians, vehicles, debris, etc.) or features of the roadway 114 (e.g., intersections, road signs, lane lines, etc.) before or beside a vehicle and classify the objects in the road. In some embodiments, the perception module 202 may include an image classification function and/or a computer vision function.

The image classification function may determine the features of an image (e.g., a visual image from the camera system 104 and/or a point cloud from the LiDAR system 106). The image classification function can be any combination of software agents and/or hardware modules able to identify image features and determine attributes of image parameters in order to classify portions, features, or attributes of an image. The image classification function may be embodied by a software module that may be communicatively coupled to a repository of images or image data (e.g., visual data and/or point cloud data) which may be used to determine objects and/or features in real time image data captured by, for example, the camera system 104 and the LiDAR system 106. In some embodiments, the image classification function may be configured to classify features based on information received from only a portion of the multiple available sources. For example, in the case that the captured visual camera data includes images that may be blurred, the system 100 may identify objects based on data from one or more of the other systems (e.g., LiDAR system 106) that does not include the image data.

The computer vision function may be configured to process and analyze images captured by the camera system 104 and/or the LiDAR system 106 or stored on one or more modules of the autonomy system 200 (e.g., in the memory 214), to identify objects and/or features in the environment surrounding the truck 102 (e.g., lane lines). The computer vision function may use, for example, an object recognition algorithm, video tracing, one or more photogrammetric range imaging techniques (e.g., a structure from motion (SfM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of its motion, size, etc.)

The mapping/localization module 204 receives perception data that can be compared to one or more digital maps stored in the mapping/localization module 204 to determine where the truck 102 is in the world and/or or where the truck 102 is on the digital map(s). In particular, the mapping/localization module 204 may receive perception data from the perception module 202 and/or from the various sensors sensing the environment surrounding the truck 102, and may correlate features of the sensed environment with details (e.g., digital representations of the features of the sensed environment) on the one or more digital maps. The digital map may have various levels of detail and can be, for example, a raster map, a vector map, etc. The digital maps may be stored locally on the truck 102 and/or stored and accessed remotely. In at least one embodiment, the truck 102 deploys with sufficiently stored information in one or more digital map files to complete a mission without connection to an external network during the mission. A centralized mapping system may be accessible via network 10 for updating the digital map(s) of the mapping/localization module 204. The digital map be built through repeated observations of the operating environment using the truck 102 and/or trucks or other vehicles with similar functionality. For instance, the truck 102, a specialized mapping vehicle, a standard autonomous vehicle, or another vehicle, can run a route several times and collect the location of all targeted map features relative to the position of the vehicle conducting the map generation and correlation. These repeated observations can be averaged together in a known way to produce a highly accurate, high-fidelity digital map. This generated digital map can be provided to each vehicle (e.g., from the network 10 to the truck 102) before the vehicle departs on its mission so it can carry it onboard and use it within its mapping/localization module 204. Hence, the truck 102 and other vehicles (e.g., a fleet of trucks similar to the truck 102) can generate, maintain (e.g., update), and use their own generated maps when conducting a mission.

The generated digital map may include an assigned confidence score assigned to all or some of the individual digital feature representing a feature in the real world. The confidence score may be meant to express the level of confidence that the position of the element reflects the real-time position of that element in the current physical environment. Upon map creation, after appropriate verification of the map (e.g., running a similar route multiple times such that a given feature is detected, classified, and localized multiple times), the confidence score of each element will be very high, possibly the highest possible score within permissible bounds.

The vehicle control module 206 may control the behavior and maneuvers of the truck 102. For example, once the systems on the truck 102 have determined its location with respect to map features (e.g., intersections, road signs, lane lines, etc.) the truck 102 may use the vehicle control module 206 and its associated systems to plan and execute maneuvers and/or routes with respect to the features of the environment. The vehicle control module 206 may make decisions about how the truck 102 will move through the environment to get to its goal or destination as it completes its mission. The vehicle control module 206 may consume information from the perception module 202 and the maps/localization module 204 to know where it is relative to the surrounding environment and what other traffic actors are doing.

The vehicle control module 206 may be communicatively and operatively coupled to a plurality of vehicle operating systems and may execute one or more control signals and/or schemes to control operation of the one or more operating systems, for example, the vehicle control module 206 may control one or more of a vehicle steering system, a propulsion system, and/or a braking system. The propulsion system may be configured to provide powered motion for the truck 102 and may include, for example, an engine/motor, an energy source, a transmission, and wheels/tires and may be coupled to and receive a signal from a throttle system, for example, which may be any combination of mechanisms configured to control the operating speed and acceleration of the engine/motor and thus, the speed/acceleration of the truck 102. The steering system may be any combination of mechanisms configured to adjust the heading or direction of the truck 102. The brake system may be, for example, any combination of mechanisms configured to decelerate the truck 102 (e.g., friction braking system, regenerative braking system, etc.) The vehicle control module 206 may be configured to avoid obstacles in the environment surrounding the truck 102 and may be configured to use one or more system inputs to identify, evaluate, and modify a vehicle trajectory. The vehicle control module 206 is depicted as a single module, but can be any combination of software agents and/or hardware modules able to generate vehicle control signals operative to monitor systems and control various vehicle actuators. The vehicle control module 206 may include a steering controller and for vehicle lateral motion control and a propulsion and braking controller for vehicle longitudinal motion.

The disclosed aspects of the system 100 of FIG. 1 and FIG. 2 of the present disclosure may be used to modify a vehicle action based on a confidence level of a classification of a detected object in the environment surrounding the truck 102. FIG. 3A depicts an exemplary process for using the system 100 of FIG. 1 and FIG. 2 according to aspects of the present disclosure. It is to be understood that the method 300 is not limited to the steps and features explicitly listed therein and that modifications including additional or fewer steps and/or features are within the scope of the various embodiments described herein.

At step 302, the system 100 may collect perception data. The perception data may represent the perceived environment surrounding the vehicle, for example, and may be collected using aspects of the perception system described herein. The perception data can come from, for example, one or more of the LiDAR system 106, the camera system 104, and various other externally-facing sensors and systems on board the vehicle (e.g., the GNSS receiver 108, etc.) For example, on vehicles having a sonar or radar system, the sonar and/or radar systems may collect perception data. As the truck 102 travels along the roadway 114, the system 100 may continuously receive data from the various systems on the truck 102. In some embodiments, the system 100 may receive data periodically and/or continuously. With respect to FIG. 1, the truck 102 may collect perception data that indicates presence of the lane lines 116, 118, 120. Features perceived by the vehicle should generally track with one or more features stored in a digital map (e.g., in the mapping/localization module 204). Indeed, with respect to FIG. 1, the lane lines that are detected before the truck 102 is capable of detecting the bend 128 in the road (that is, the lane lines that are detected and correlated with a known, mapped feature) will generally match with features in stored map and the vehicle will continue to operate in a normal fashion (e.g., driving forward in the left lane of the roadway or per other local road rules). However, in the depicted scenario the vehicle approaches a new bend 128 in the road that is not stored in any of the digital maps onboard the truck 102 because the lane lines 116, 118, 120 have shifted right from their original positions 122, 124, 126.

At step 304, the system 100 may compare the collected perception data with stored data. For example, the system may identify and classify various features detected in the collected perception data from the environment with the features stored in a digital map. For example, the detection systems may detect the lane lines 116, 118, 120 and may compare the detected lane lines with lane lines stored in a digital map. Additionally, the detection systems could detect the road signs 132*a*, 132*b* and the landmark 134 to compare such features with features in a digital map. The features may be stored as points (e.g., signs, small landmarks, etc.), lines (e.g., lane lines, road edges, etc.), or polygons (e.g., lakes, large landmarks, etc.) and may have various properties (e.g., style, visible range, refresh rate, etc.), which properties may control how the system 100 interacts with the various features. Based on the comparison of the detected features with the features stored in the digital map(s), the system may generate a confidence level, which may represent a confidence of the vehicle in its location with respect to the features on a digital map and hence, its actual location. As used herein, the term "confidence level" or "confidence score" refers to a single-dimensional or multi-dimensional confidence (i.e., a confidence region). The more closely the detected features align with the features stored in a digital map, the higher the confidence level will be.

At step 306, the system 100 may modify a confidence level based on a deviation between features in the collected perception data and the features stored in the digital map. For example, with reference to FIG. 1, as the bend 128 comes within the vehicle's perception radius 130, the truck 102 will perceive that features previously identified as lane lines to a high confidence level begin to turn to the right, but because the map features have not been updated accordingly, the stored map features will continue to track with the original lane lines, causing a difference between the detected features and the stored map features. In some embodiments, the truck 102 may deploy on a given mission with a set of maps and may not be in constant communication with a network server to download immediately updateable and/or update maps. In other embodiments, the changes to the environment could have taken place before any map was able to be updated. Accordingly, the environmental changes are unknown to the vehicle and a relatively unknown picture is presented (i.e., with a lower confidence level). Further, as the difference between the detected features and the stored features increases, the confidence level will continue to decrease.

If the confidence level does not decrease significantly (e.g., if there is not much of a change in the amount of difference between a detected feature and a stored map feature) at step 308, then the truck 102 may continue as normal at step 310. That is, the truck 102 may continue to operate on the roadway 114. For example, a portion of one or more lane lines or other features may be undetectable by the perception system (e.g., if a portion of some of the lane lines has been occluded but not all, if all of only a few of the lane lines have been occluded and are not detectable, etc.) In such case, the system 100 may rely on the detectability of other features within the environment and the ability to appropriately classify and correlate those features with features in the stored digital map to maintain a confidence level above a threshold. However, if the confidence level decreases below a threshold confidence level at step 308, then the vehicle may take one or more actions in response. The threshold confidence level with respect to a detected object may be based on, for example, a number of times the detected object has been identified by the perception systems of a fleet of vehicles connected to the network 10. For instance if a road sign, such as the road sign 132*a*, has been identified hundreds of times by a fleet of vehicles, identification of the road sign may correspond with a high confidence level and, conversely, if the road sign is not identified at an expected location, this lack of identification may correspond with a relatively large decrease in confidence level, because the road sign has been identified so many times. Relatedly, in some instances, a particular physical feature may have to have been identified by perception engines a threshold number of times and correlated with one or more features before it is able to affect a confidence level, so that transient features (e.g., road cones, etc.) do not necessarily affect a confidence level and thus unnecessarily or erroneously affect vehicle behavior.

In some embodiments, a change in confidence level or a change in the behavior of the truck 102 may be based on, for example, a type of difference between the perception data and the stored digital map data. For example, a change in behavior may be based on whether a change in the perception data is based on perceived objects in the environment that aren't roadway features and perceived features of a roadway (e.g., lane lines, etc.). Different objects in the environment may be treated differently because they may be more or less important to the operation of the truck 102. With brief reference to FIG. 1, the various lane lines in the figure may be more critical to vehicle operation than the landmark 134 and/or the stop sign 132*b*, for example. Hence, the truck 102 may take exhibit particular behaviors based on the type of perception data received. In some embodiments, the perception data may be classified within the perception module 202, for example, as an input to the vehicle control module 206. Data based on various perceived objects or features in the environment may be, for example, ranked into a hierarchy for affecting vehicle behavior. In some embodiments, the lane lines may be at or near a top of the hierarchy, while landmarks and other objects not on the roadway may have a lower or less critical role in affecting vehicle behavior. In some embodiments, other vehicles in the environment surrounding the truck 102 may have a place on the hierarchy such that the behavior of other vehicles in the environment has an effect on the truck 102.

For example, at step 312, the truck 102 may inform a server remote from the vehicle (e.g., by providing comparison data associated with a comparison between perception data collected and digital map data stored on the truck 102 to the network 10) that there is an unexpected change in the confidence level to alert the central server (and potentially other vehicles communicatively coupled with the central server) that there may be a change in the environment surrounding the truck 102. This information could be used by other vehicles to alter their own behavior as necessary based on the change in the environment as described in greater detail herein. The truck 102 may inform the central server 10 using, for example, the transceiver 112. As alluded to, in some embodiments, the central server will have connections with other vehicles and the central server could send instructions to the truck 102 and the other vehicles to alter their behavior or take one or more other actions. For instance, the central server could alert one or more remote operators to take control of the vehicle(s), could deploy one or more scouts to the area with the unknown features to determine a clearer picture, etc. In some embodiments, the server does not control the behavior of the truck 102 at or only partially and the truck 102 may make behavioral changes based on reduced confidence level itself.

For instance, at step 314, the truck 102 may take one or more actions to modify operation of the vehicle (i.e., modifying its own behavior) based on an amount of difference between the perception data and the digital map data. In some embodiments, this may be embodied as a reduction in the confidence level. As an example, the truck 102 may implement one or more conservative driving actions based on the amount of difference between the perception data and the digital map data. Further, in some examples, the truck 102 may take various levels of action based on the type of difference, for example taking more conservative actions when the type of difference is based on perceived features versus perceived objects in the environment. The truck 102 may slow and/or stop on a side of the road based on an amount of difference between the perception data and the digital map data, which may be embodied as, for example, a reduction in confidence level. Additionally or alternatively, the truck 102 may activate additional sensors and/or change a perception radius and/or perception direction to identify, classify, and locate additional features, which could be cross referenced against the digital map. In some embodiments, the truck 102 may prohibit lane changes. With respect to FIG. 1, the truck 102 may slow such that it approaches the bend 128 more slowly, giving the truck 102 more time to react to the bend 128 in the roadway 114 and to follow the newly-determined lane lines 116, 118, 120 appropriately. In another embodiment, the truck 102 could slow and stop or simply stop based on the reduced confidence level. For example, the truck 102 could pull over onto a shoulder of the roadway 114 so that it is not operating in an unknown environment.

At step 316, the truck 102 may collect additional perception data to increase its confidence level. For instance, the mapping/localization module 204 may store one or more maps with data showing the location of road signs and/or landmarks in the various layers of the map. With brief reference to FIG. 1, the localization software could use map layers that include the road signs 132*a*, 132*b* and the landmark 134 to localize the vehicle based on a detection of the road signs 132*a*, 132*b* and the landmark 134 in the environment with the perception engine and proper classification of such features. In some embodiments, the truck 102 may observe the newly detected features and may compare aspects of the features with the features presently stored in the digital map in order to increase the confidence level. If the truck 102 is able to increase the confidence level above the threshold value at step 316 by collecting additional perception data with its own sensors and equipment, the system may return to step 308 to determine that the confidence level is above the threshold and may proceed to step 310 to continue normal operations with the newly increased confidence level based on the newly detected and determined digital map data based on the newly determined sensory data. If, however, the truck 102 cannot increase the confidence level without additional information (e.g., from an outside source), the truck 102 may pull over, stop and inform the central server in order to receive additional information before continuing as further described herein.

Referring to FIG. 3B and FIG. 4, in some embodiments, the truck 102 may stop and wait to receive additional perception data from a second vehicle (or an $n^{th}$ vehicle) to increase its confidence level before proceeding. For instance, upon a determination that a particular sensed environment is not suitable for continued operation (e.g., a confidence score for one or more features in the environment is sufficiently low that continued normal operation in the environment is not feasible), the truck 102 may pull over and completely stop at step 316*a* and may collect perception data while the truck 102 is stopped at step 316*b* to determine whether the confidence level is still below the threshold at step 316*c*. If the confidence level is not below the threshold, the truck 102 may continue normal operation at step 316*d*, but if so, the truck 102 may send perception data to the network 10 at step 316*e* if the confidence level is below the threshold level and this information may be provided to a second vehicle, such as a second truck 103. For example, referring to FIG. 4, the (first) truck 102 may send updates regarding its sensed environment to the network 10 to inform the network 10 that one or more features of the environment are not as expected by the first truck 102. Based on this determination by the first truck 102 and transmission between the first truck 102 and the network 10, the network 10 may cause the second truck 103 to deploy to the area (in some embodiments, the second truck 103 may not need to be deployed, but may be otherwise scheduled to travel to the area in which the first truck 102 operates (e.g., two vehicles circumstantially having a similar route)), driving past the first truck 102 on the roadway 114 to collect additional perception data that is uncollectable by the first truck 102 because it is outside of a perception radius of the first truck 102. In some embodiments, the second truck 103 may automatically adjust or have adjusted its confidence level based on an adjusted confidence level of the first truck 102. In some embodiments, the second truck 103 may automatically adjust or have adjusted its confidence level based on an adjusted confidence level of the first truck 102.

In some embodiments, the operation of the second truck 103 may be modified based on the reduced confidence level at step 316*e*. For example, the second truck 103 may operate at a more cautious operational profile based on the reduced confidence level formed based on the information from the first truck 102 at step 316*f*. For example, the second truck 103 may slow and/or stop (similar to the first truck 102 stopped on the road side in FIG. 4). In some embodiments, the second truck 103 may not change its operational profile if, for example, it is already aware of the changed conditions and hence its confidence level is not affected by the changed conditions. The second truck 103 may proceed to collect additional perception data to increase the confidence level at step 316*g*. The additional collected perception data can be provided to the network 10 in order to calculate the confidence level. In some embodiments, additional trucks in addition to the first truck 102 and the second truck 103 may be used. For example, a third truck, a fourth truck, an $n^{th}$ truck could subsequently carry out the steps listed above in succession to update the confidence level until it is above the threshold.

Additionally, with continued reference to FIG. 4, in some embodiments, the first truck 102 and/or the second truck 103 could collect additional perception data to increase the confidence level based on the road behavior of other ambient vehicles in the environment (e.g., vehicles not connected to the network 10 such as the vehicle 105 and vehicle 107 of FIG. 1) and other traffic in the environment (e.g., cyclists, pedestrians, and other static and dynamic objects). For example, the perception engine could observe various objects (e.g., vehicles driven by human operators) passing along the roadway, navigating the bend 128 and staying between the lane lines 116, 118 driving forward along the road 114. As the objects pass and are classified (e.g., as other vehicles, pedestrians, etc.) and/or as the first truck 102 receives additional perception data from the second truck 103 via the network 10, the first truck 102 could begin to increase its confidence level in the features in the environment and/or the road rules for the given location based on the repeated observations. In some embodiments, the second truck 103 (and/or the $n^{th}$ vehicle (not shown)) could stop if the confidence level is too low and the first truck 102 could drive past the second truck 103 (or nth vehicle) further along the roadway 114 until such time as it may no longer be capable of operating based on a reduced confidence level, at which point the first truck 102 would pull over and stop, and a different vehicle could pass it to collect even more perception data, and so on until the confidence level is increased above the threshold. For instance, in a two truck "leapfrogging" method, the first truck 102 may drive past the second truck 103 until its confidence score again drops below to a sufficiently low level to require stopping and/or slowing to collect more perception data and then the second truck 103 could pass the first truck 102 again, and so on.

In embodiments in which two or more vehicles (i.e., a fleet) are connected to the network 10, each of the vehicles in the fleet of vehicles to encounter the altered condition (e.g., the bend 128) could approach the altered condition differently based on the individual confidence level of the vehicle. That is, the vehicle operation of the second truck 103 could be modified (e.g., based on comparison data provided by a previous vehicle to a remote server (e.g., the network 10)) at an earlier point along the roadway 114 than the vehicle operation of the first truck 102 along the roadway 114 to increase fidelity of the information obtained by the sensors aboard the second truck 103. This data with higher fidelity could be transmitted to the first truck increasing its own confidence level. Additionally, completely stopping the first truck 102 to detect a changed condition could reduce uncertainty because the truck is no longer moving and hence in a less dynamic situation with respect to the objects in the surrounding environment. The stopped vehicle could observe objects and road behavior for a greater amount of time before restarting movement (e.g., as long as necessary to increase the confidence level above the threshold). In some embodiments, the first truck 102 and/or the second truck 103 may only need to connect to the external server when the confidence level of either of the first vehicle and the second vehicle is below a threshold confidence level. In some embodiments, the first truck 102 and/or the second truck 103 may only need to connect to the external server when the confidence level of either of the first vehicle and the second vehicle is below a threshold confidence level.

In some embodiments, modifications to the vehicle's behavior upon detection of the changed condition may depend on how close the modified condition is to the truck 102 when it is detected and/or how quickly the truck 102 would arrive at the altered condition if it were to not alter its behavior. That is, a severity of vehicle behavioral alteration may be based on how quickly the truck 102 will reach the lowered confidence level condition. For example, with respect to FIG. 1, the bend 128 in the road 114 could be detected only when the vehicle is within a fourth of five zones of a detection radius. Because there may be a relatively long time until the truck 102 actually reaches the bend, the truck 102 may simply slow, allowing more time for the truck 102 to determine a confidence level and one or more behavioral changes based on the confidence level. In an alternative example, if the truck 102 only detected the bend 128 with the bend in a detection zone closer to the truck 102, it may take more drastic measures, for instance stopping completely. The principles apply to a scenario in which the truck 102 is traveling at a relatively high speed and detects the altered condition (e.g., the bend 128) as compared with traveling at a relatively low speed. That is, at the high speed, the truck 102 may take more drastic measures upon detection of the altered condition. Further, the relative degree of the alteration of the condition (e.g., a bend in the road of a higher degree than another (e.g., a ninety degree turn vs. a ten degree turn)) could cause the vehicle to take more drastic behavioral alterations. In general, the level of behavioral alterations may be proportional to the rate of decrease in confidence level.

It should now be understood that an autonomously-capable vehicle may use data about the environment surrounding it to compare detected features with features stored on a map and make one or more alterations to the behavior of the vehicle based on differences between the detected features and the stored features. By detecting changes and gathering additional information about the changes, the vehicles can share information between themselves (e.g., via a central server) and operate more efficiently across a fleet of vehicles. Accordingly, the more efficient operation will result in a greater number of miles travelled and a better understanding of the roads on which the vehicles travel. It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

We claim:

1. A method of controlling an autonomous vehicle, comprising:

collecting perception data representing a perceived environment of a first vehicle using a perception system on board the first vehicle while the first vehicle is traveling along a roadway in the perceived environment, the perception data further including at least some data collected by a second vehicle traveling along the roadway;

comparing the perception data collected with digital map data stored on the first vehicle;

determining a confidence level based on the comparing; and in response to the confidence level for the first vehicle being below a threshold:

providing comparison data associated with the comparison between the perception data collected and the digital map data stored on the first vehicle to a server remote from the first vehicle; and modifying operation of the first vehicle and operation of the second vehicle, based on the comparison data, modifying the operation of the first vehicle and the second vehicle further comprising:

causing one of the first vehicle and the second vehicle to stop and collect additional perception data to increase the confidence level while the one of the first vehicle and the second vehicle is stopped;

causing the other of the first vehicle and the second vehicle to drive past the one of the first vehicle and the second vehicle and collect the additional perception data to further increase the confidence level; and repeating causing the one of the first vehicle and the second vehicle and causing the other of the first vehicle and the second vehicle until the confidence level is at or above the threshold.

2. The method of claim 1, wherein the data collected by the second vehicle is collected after the first vehicle has modified its operation by implementing more conservative driving as a function of the difference between the perception data and the digital map data.

3. The method of claim 2, wherein the data collected by the second vehicle is collected from the perceived environment at a location further along a travel path of the first vehicle.

4. The method of claim 1, wherein modifying the operation of the first vehicle or the second vehicle is also based on a type of difference between the perception data collected by the first and second vehicles and the digital map data.

5. The method of claim 1, wherein the perception data further includes data related to one or more ambient vehicles in the environment surrounding the autonomous vehicle.

6. The method of claim 5, wherein the perception data related to the one or more ambient vehicles in the environment develops one or more road rules in at least one of the first vehicle or the second vehicle.

7. A method of operating a fleet of vehicles in an environment including a first vehicle and a second vehicle, comprising:

collecting perception data representing a perceived environment using a perception system on board the first vehicle while the first vehicle is traveling along a roadway in the perceived environment, the perception data further including at least some data collected by a second vehicle traveling along the roadway;

comparing the perception data collected by the first vehicle with stored digital map data;

determining a confidence level based on the comparing;

modifying the confidence level based on a difference between the collected perception data and the stored digital map data, wherein the confidence level represents a confidence that the perceived environment is accurately identified and aligned with a representation of the perceived environment in the stored digital map data;

in response to the modified confidence level for the first vehicle being below a threshold:

presenting the difference between the collected perception data and the stored digital map data to an external server remote from the first vehicle;

modifying operation of the first vehicle and operation of the second vehicle based on the difference between the collected perception data and the stored digital map data presented to the external server, modifying the operation of the first vehicle and the operation of the second vehicle further comprising:

causing one of the first vehicle and the second vehicle to stop and collect additional perception data to increase the confidence level while the one of the first vehicle and the second vehicle is stopped;

causing the other of the first vehicle and the second vehicle to drive past the one of the first vehicle and the second vehicle and collect the additional perception data to further increase the confidence level; and repeating causing the one of the first vehicle and the second vehicle and causing the other of the first vehicle and the second vehicle until the confidence level is at or above the threshold;

collecting perception data representing the perceived environment using the perception system on board the second vehicle; and modifying the confidence level based on a difference between the collected perception data and the stored digital map data.

8. The method of claim 7, further comprising:

modifying the confidence level based on a difference between the perception data collected by the first vehicle and the perception data collected by the second vehicle.

9. The method of claim 7, wherein modifying the operation of the first vehicle and the operation of the second vehicle includes implementing more conservative driving of the respective vehicle as a function of an amount of difference between the perception data and the digital map data.

10. The method of claim 9, wherein the more conservative driving includes at least one of i) slowing a speed of at least one of the first vehicle or the second vehicle, or ii) prohibiting lane changes of at least one of the first vehicle or the second vehicle.

11. The method of claim 7, wherein the collected perception data includes data collected representing road behavior of ambient vehicles in the environment.

12. The method of claim 7, wherein each of the first vehicle and the second vehicle operate with all necessary perception, localization, and vehicle control software and data necessary to operate fully autonomously.

13. The method of claim 7, wherein the first vehicle and the second vehicle are configured such that they need only to connect to the external server when the confidence level of either of the first vehicle and the second vehicle is below the threshold.

14. The method of claim 7, wherein the system is further configured to automatically adjust a confidence level of the second vehicle based on a degraded confidence level of the first vehicle.

15. The method of claim 7, wherein modifying the operation of the first vehicle and the operation of the second vehicle is also based on a type of difference between the perception data and the digital map data.

16. The method of claim 15, wherein a type of difference includes differences between perceived objects and perceived features of a roadway, and modification of operation of at least one of the first vehicle or the second vehicle is more conservative when the type of difference is based on perceived features of the roadway.

17. A system comprising:

a first vehicle and a second vehicle, each of the first vehicle and the second vehicle including a perception system, a mapping/localization system, a processor, and a memory storing one or more processor-executable instructions, that when executed by the processor cause the system to:

collect perception data representing a perceived environment using the perception system on board the first vehicle while the first vehicle is traveling along a roadway in the perceived environment, the perception data further including at least some data collected by a second vehicle traveling along the roadway;

compare the perception data collected by the first vehicle with stored digital map data;

determine a confidence level based on the comparison;

modify the confidence level based on a difference between the collected perception data and the stored digital map data, wherein the confidence level represents a confidence that the perceived environment is accurately identified and aligned with a representation of the perceived environment in the stored digital map data;

in response to the modified confidence level for the first vehicle being below a threshold:

present the difference between the collected perception data and the stored digital map data to an external server remote from the first vehicle;

modify operation of the first vehicle and operation of the second vehicle based on the difference between the collected perception data and the stored digital map data presented to the external server, modify the operation of the first vehicle and the second vehicle further comprising:

cause one of the first vehicle and the second vehicle to stop and collect additional perception data to increase the confidence level while the one of the first vehicle and the second vehicle is stopped;

cause the other of the first vehicle and the second vehicle to drive past the one of the first vehicle and the second vehicle and collect the additional perception data to further increase the confidence level; and repeat cause the one of the first vehicle and the second vehicle and cause the other of the first vehicle and the second vehicle until the confidence level is at or above the threshold;

collect perception data representing the perceived environment using the perception system on board the second vehicle; and modify the confidence level based on a difference between the collected perception data and the stored digital map data.

18. The system of claim 17, further comprising automatically adjusting a confidence level of the second vehicle based on a degraded confidence level of the first vehicle.

19. The system of claim 17, wherein each of the first vehicle and the second vehicle operate with all necessary perception, localization, and vehicle control software and data necessary to operate fully autonomously.

* * * * *